(12) United States Patent
Kamata et al.

(10) Patent No.: US 9,910,442 B2
(45) Date of Patent: Mar. 6, 2018

(54) OCCLUDED AREA DETECTION WITH STATIC OBSTACLE MAPS

(71) Applicant: Toyota Motor Engineering & Manufacturing North America, Inc., Erlanger, KY (US)

(72) Inventors: Nobuhide Kamata, Ann Arbor, MI (US); Xue Mei, Ann Arbor, MI (US); Katsuhiro Sakai, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 53 days.

(21) Appl. No.: 15/195,770

(22) Filed: Jun. 28, 2016

(65) Prior Publication Data
US 2017/0371338 A1    Dec. 28, 2017

(51) Int. Cl.
*G01C 22/00* (2006.01)
*G05D 1/02* (2006.01)
(Continued)

(52) U.S. Cl.
CPC .......... *G05D 1/0214* (2013.01); *G01S 17/93* (2013.01); *G05D 1/0088* (2013.01); *G05D 1/024* (2013.01);
(Continued)

(58) Field of Classification Search
CPC .............................. G05D 1/0214; G01S 17/93
See application file for complete search history.

(56) References Cited

U.S. PATENT DOCUMENTS

| 8,589,014 | B2 | 11/2013 | Fairfield et al. |
| 9,164,511 | B1 | 10/2015 | Ferguson et al. |
| (Continued) | | | |

FOREIGN PATENT DOCUMENTS

| JP | 11149557 A | 6/1999 |
| JP | 2009301400 A | 12/2009 |
| JP | 2012238151 A | 12/2012 |

OTHER PUBLICATIONS

Detrovskaya et al., "Model Based Vehicle Detection and Tracking for Autonomous Urban Driving", retrieved from the Internet: <http://cs.stanford.edu/group/manips/publications/pdfs/Petrovskaya_2009_AURO.pdf>, [retrieved Apr. 12, 2016], published online Apr. 1, 2009 (17 pages).
(Continued)

*Primary Examiner* — Adam Alharbi
(74) *Attorney, Agent, or Firm* — Christopher G. Darrow; Darrow Mustafa PC

(57) ABSTRACT

Ray tracing and static obstacle maps can be used in the operation of a vehicle. Sensor data of at least a portion of an external environment of the vehicle can be acquired. A dynamic obstacle in the external environment of the vehicle can be detected based on the acquired sensor data. In response to detecting a dynamic obstacle, it can be determined whether a secondary occluded area is located behind the dynamic obstacle relative to a current location of the vehicle based on a static obstacle map. Responsive to determining that a secondary occluded area is located behind the dynamic obstacle relative to a current location of the vehicle based on a static obstacle map, a driving maneuver for the vehicle can be determined based on at least the dynamic obstacle and the secondary occluded area. The vehicle can be caused to implement the determined driving maneuver.

20 Claims, 12 Drawing Sheets

(51) Int. Cl.
G01S 17/93 (2006.01)
G05D 1/00 (2006.01)
G01S 13/93 (2006.01)
G01S 15/93 (2006.01)

(52) U.S. Cl.
CPC ......... *G05D 1/0255* (2013.01); *G05D 1/0257* (2013.01); *G05D 1/0274* (2013.01); *G01S 13/93* (2013.01); *G01S 15/93* (2013.01)

(56) References Cited

U.S. PATENT DOCUMENTS

| | | | |
|---|---|---|---|
| 9,216,745 | B2 * | 12/2015 | Beardsley ............. B60W 50/10 |
| 9,432,929 | B1 | 8/2016 | Ross et al. |
| 2012/0316725 | A1 | 12/2012 | Trepagnier et al. |
| 2014/0139676 | A1 | 5/2014 | Wierich |
| 2014/0330456 | A1 | 11/2014 | Lopez Morales et al. |
| 2015/0045994 | A1 * | 2/2015 | Krishna ................. B64C 25/44 701/3 |
| 2015/0272413 | A1 | 10/2015 | Miyake et al. |
| 2015/0334269 | A1 | 11/2015 | Yokota et al. |
| 2016/0221500 | A1 | 8/2016 | Sakai et al. |
| 2017/0185089 | A1 | 6/2017 | Mei et al. |

OTHER PUBLICATIONS

Petrovskaya, "Towards Dependable Robotic Perception", A Dissertation Submitted to the Department of Computer Science and the Committee on Graduate Studies of Stanford University, Jun. 2011 (226 pages).
Vu et al., "Online Localization and Mapping with Moving Object Tracking in Dynamic Outdoor Environments", IEEE Intelligent Vehicles Symposium, Istanbul, Turkey, Jun. 13-15, 2007, pp. 190-195 (6 pages).
Montemerlo et al., "Junior: The Stanford Entry in the Urban Challenge", retrieved from the Internet: <http://robots.stanford.edu/papers/junior08.pdf>, [retrieved Apr. 12, 2016], undated (31 pages).
Coue et al., "Bayesian Occupancy Filtering for Multitarget Tracking: an Automotive Application", The International Journal of Robotics Research, Jan. 2006, pp. 19-30, retrieved from the Internet: <https://hal.inria.fr/inria-00182004/document>, [retrieved Apr. 12, 2016] (13 pages).
Baumann et al., "Occlusion-Free Path Planning with a Probabilistic Roadmap", IEEE, International Conference on Intelligent Robots and Systems, 2008, retrieved from the Internet: <http://www.cs.ubc.ca/~little/links/linked-papers/OcclusionFreePathPlanning_final.pdf>, [retrieved Apr. 12, 2016] (6 pages).
Wikipedia, "Ray tracing (graphics)", retrieved from the Internet: <https://en.wikipedia.org/wiki/Ray_tracing_(graphics)>, [retrieved Apr. 12, 2016] (10 pages).
Pfaff et al., "An Efficient Extension of Elevation Maps for Outdoor Terrain Mapping", Department of Computer Science, University of Freiburg, Germany, undated (12 pages).
Pepik et al., "Occlusion Patterns for Object Class Detection", CVPR, 2013, pp. 3286-3293 (8 pages).
Heckman et al., "Potential Negative Obstacle Detection by Occlusion Labeling", IEEE/RSJ International Conference on Intelligent Robots and Systems, Oct. 29-Nov. 2, 2007, pp. 2168-2173 (6 pages).
Xiang et al., "Object Detection by 3D Aspectlets and Occlusion Reasoning", ICCV, 2013, pp. 530-537 (8 pages).
Hsiao et al., "Coherent Occlusion Reasoning for Instance Recognition", The Robotics Institute, Carnegie Mellon University, Pittsburgh, PA, 2013 (5 pages).
Douillard et al., "A 3D Laser and Vision Based Classifier", Australian Centre for Field Robotics, Sydney, Australia, 2009 (6 pages).
Linder et al., "Multi-view point cloud fusion for LiDAR based cooperative environment detection", Advances in Radio Science, 2015, pp. 209-215 (7 pages).
Er et al., "Perception of Dynamic Environments in Autonomous Robots", Proceedings of the 17th World Congress, The International Federation of Automatic Control, Seoul, Koreal, Jul. 6-11, 2008, pp. 8226-8231 (6 pages).
Biswas, "Hybrid Markov / Non-Markov Localization for Long-Term Autonomy of Mobile Robots in Varying Indoor Environments", The Robotics Institute, Carnegie Mellon University, Pittsburgh, PA, Thesis Proposal, undated (83 pages).
Teichman et al., "Towards 3D Object Recognition via Classification of Arbitrary Object Tracks", IEEE International Conference on Robotics and Automation, Shanghai International Conference Center, May 9-13, 2011, pp. 4034-4041 (8 pages).
Felzenswalb et al., "Efficient Graph-Based Image Segmentation", International Journal of Computer Vision, 2004, pp. 167-181 (15 pages).
Kuthirummal et al., "A Graph Traversal based Algorithm for Obstacle Detection using Lidar", IEEE/RSJ International Conference on Intelligent Robots and Systems, Sep. 25-30, 2011, San Francisco, CA, USA, pp. 3874-3880 (7 pages).
Nguyen, "Constructing Drivability Maps From 3D Laser Range Data for Autonomous Vehicles", pp. 1-17 (17 pages).

\* cited by examiner

OCCLUDED AREA DETECTION WITH STATIC OBSTACLE MAPS

FIELD

The subject matter described herein relates in general to vehicles and, more particularly, to the operation of vehicles in environments using static obstacle maps.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the subject matter described herein is directed to a method of operating a vehicle. The method includes acquiring sensor data, using one or more sensors, of at least a portion of an external environment of the vehicle. The method includes detecting a dynamic obstacle in the external environment of the vehicle based on the acquired sensor data. The method also includes, responsive to detecting a dynamic obstacle in the external environment of the vehicle based on the acquired sensor data, determining whether a secondary occluded area is located behind the dynamic obstacle relative to a current location of the vehicle based on a static obstacle map. Such determining can be performed using a processor. Responsive to determining that a secondary occluded area is located behind the dynamic obstacle relative to a current location of the vehicle based on a static obstacle map, the method can further include determining a driving maneuver for the vehicle based on at least the dynamic obstacle and the secondary occluded area. The method can include causing the vehicle to implement the determined driving maneuver.

In another respect, the subject matter described herein is directed to a system for a vehicle. The system can include a sensor system and a processor operatively connected to the sensor system. The sensor system can be configured to acquire sensor data of at least a portion of an external environment of the vehicle. The processor can be configured to detect a dynamic obstacle in the external environment of the vehicle based on the acquired sensor data. The processor can be further configured to, responsive to detecting a dynamic obstacle in the external environment of the vehicle based on the acquired sensor data, determine whether a secondary occluded area is located behind the dynamic obstacle relative to a current location of the vehicle based on a static obstacle map. Responsive to determining that a secondary occluded area is located behind the dynamic obstacle relative to a current location of the vehicle based on a static obstacle map, the processor can also be configured to determine a driving maneuver for the vehicle based on at least the dynamic obstacle and the secondary occluded area. The processor can be configured to cause the vehicle to implement the determined driving maneuver.

In another respect, the subject matter described herein is directed to a method of updating a static obstacle map. The method includes acquiring sensor data, using one or more sensors, of at least a portion of an external environment of the vehicle. The method can also include detecting an obstacle in the external environment of the vehicle based on the acquired sensor data. The method can further include determining a location for the detected obstacle. The method can include determining, using a static obstacle map, whether the location of the obstacle is behind an expected location of a static obstacle included in the static obstacle map relative to a current location of the vehicle. Responsive to determining that the location of the obstacle is behind the expected location of a static obstacle included in the static obstacle map relative to the current location of the vehicle, the method can include sending a command to update the static obstacle map by removing the static obstacle.

In one or more arrangements, the method can further include causing the static obstacle map to be updated by removing the static obstacle. In one or more arrangements, the one or more sensors can be one or more LIDAR sensors. In such case, the sensor data can be LIDAR sensor data. In one or more arrangements, the one or more sensors can include one or more radar sensors, one or more cameras, and/or one or more sonar sensors. In one or more arrangements, determining, using a static obstacle map, whether the location of the detected obstacle is behind an expected location of a static obstacle included in the static obstacle map relative to a current location of the vehicle can include: determining, using ray tracing on the static obstacle map, an occluded sensor coverage area located behind the static obstacle included in the static obstacle map; determining whether the location of the detected obstacle is within the occluded sensor coverage area; and responsive to determining that the location of the detected obstacle is within the occluded sensor coverage area; determining that the location of the detected obstacle is behind an expected location of a static obstacle included in the static obstacle map relative to a current location of the vehicle.

In still another respect, the subject matter presented herein is directed to a system for updating a static obstacle map. The system can include a sensor system. The sensor system can be configured to acquire sensor data of at least a portion of an external environment of the vehicle. The system can also include a processor operatively connected to the sensor system. The processor can be configured to detect an obstacle in the external environment of the vehicle based on the acquired sensor data. The processor can be configured to determine a location for the detected obstacle. The processor can be configured to determine, using a static obstacle map, whether the location of the obstacle is behind an expected location of a static obstacle included in the static obstacle map relative to a current location of the vehicle. The processor can further be configured to, responsive to determining that the location of the obstacle is behind the expected location of a static obstacle included in the static obstacle map relative to the current location of the vehicle, send a command to update the static obstacle map by removing the static obstacle.

In one or more arrangements, the processor can be further configured to cause the static obstacle map to be updated by removing the static obstacle. In one or more arrangements, the one or more sensors can be one or more LIDAR sensors. In such case, the sensor data can be LIDAR sensor data. In one or more arrangements, the one or more sensors can include one or more radar sensors, one or more cameras, and/or one or more sonar sensors. In one or more arrangements, determining, using a static obstacle map, whether the location of the detected obstacle is behind an expected location of a static obstacle included in the static obstacle map relative to a current location of the vehicle can include: determining, using ray tracing on the static obstacle map, an occluded sensor coverage area located behind the static obstacle included in the static obstacle map; determining whether the location of the detected obstacle is within the occluded sensor coverage area; and responsive to determining that the location of the detected obstacle is within the occluded sensor coverage area; determining that the location of the detected obstacle is behind an expected location of a static obstacle included in the static obstacle map relative to a current location of the vehicle. In one or more arrangements, the system can further include a data store communicatively linked to the processor. The static obstacle map can be included in the data store. In one or more arrangements, the sensor system, the processor, and the data store can be located onboard a vehicle. In one or more arrangements, the data store can be located on a server that is remote from the vehicle. The data store can be communicatively linked to the vehicle.

DETAILED DESCRIPTION

Figure 1:
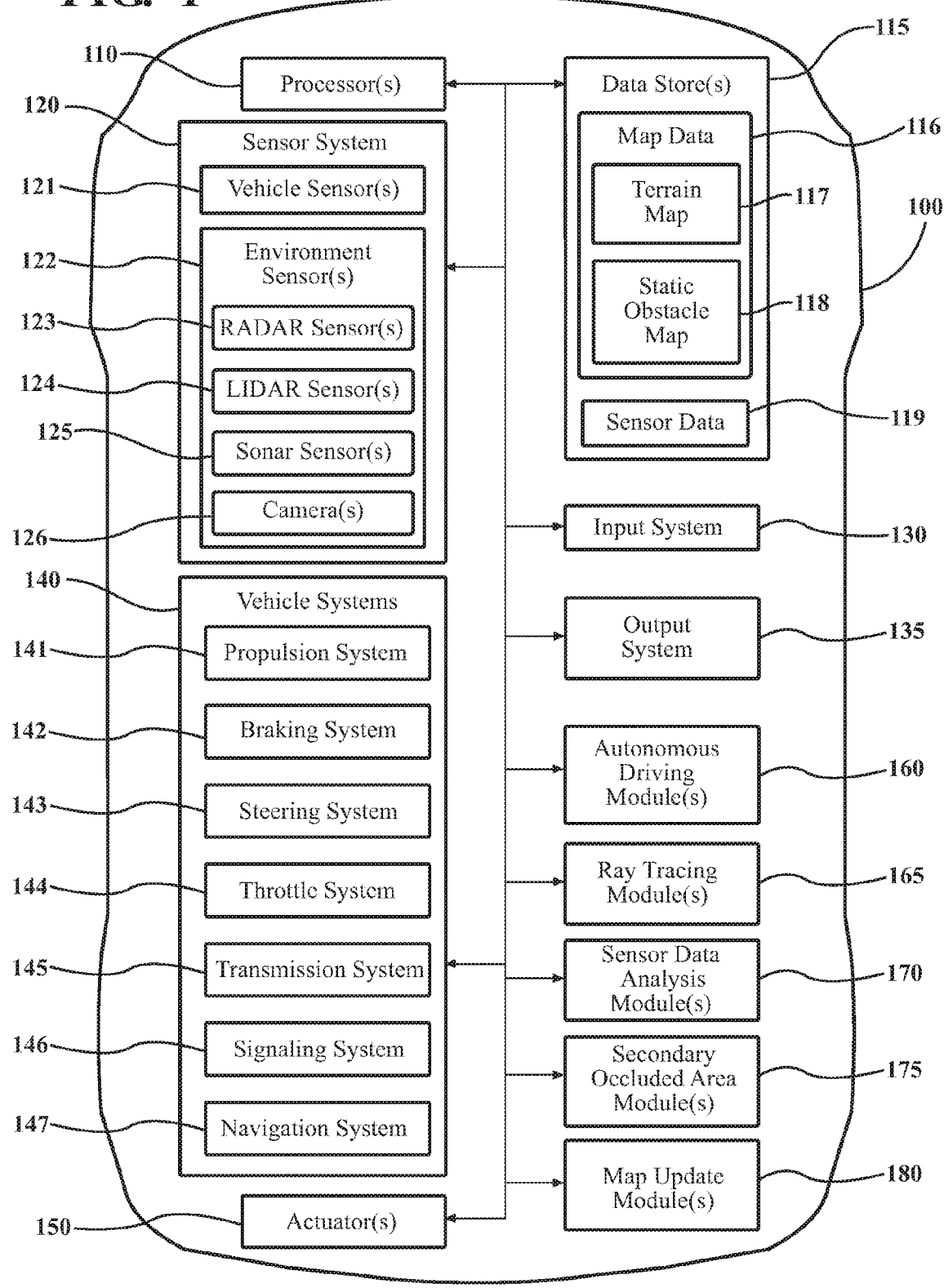
FIG. 1 is an example of a vehicle configured to determine secondary occluded areas.

This detailed description relates to the use of static obstacle maps in the operation of a vehicle. For example, static obstacle maps can be used in driving scenarios in which there are secondary occluded areas. As used herein, a "secondary occluded area" is a portion of an external environment of a vehicle that is occluded to vehicle sensors by both a dynamic obstacle and a static obstacle when the static obstacle is located behind the dynamic obstacle relative to a current location of the vehicle. A dynamic obstacle can be detected in the external environment of the vehicle based on sensor data acquired by one or more sensors. Using a static obstacle map, it can be determined whether a secondary occluded area is located behind the dynamic obstacle relative to a current location of the vehicle. A driving maneuver for the vehicle can be determined based on at least the dynamic obstacle and the secondary occluded area. The vehicle can be caused to implement the determined driving maneuver. The present detailed description relates to systems and/or methods that incorporate one or more of such features. In at least some instances, such systems and/or methods can improve safety and/or performance of a vehicle.

As another example, static obstacle maps can be updated based on real-time sensor data acquired by a vehicle. Sensor data of at least a portion of an external environment of the vehicle can be acquired using one or more sensors. An obstacle can be detected in the external environment of the vehicle based on the acquired sensor data. A location for the detected obstacle can be determined. Using a static obstacle map, it can be determined whether the location of the obstacle is behind an expected location of a static obstacle included in the static obstacle map relative to a current location of the vehicle. Responsive to determining that the location of the obstacle is behind the expected location of a static obstacle included in the static obstacle map relative to the current location of the vehicle, a command to update the static obstacle map by removing the static obstacle can be sent.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated.

The vehicle 100 can have a plurality of autonomous or semi-autonomous operational modes. For instance, the vehicle 100 can have an unmonitored autonomous operational mode in which or more computing systems are used to navigate and/or maneuver the vehicle along a travel route with no input or supervision required from a human driver. The vehicle 100 can have a monitored autonomous operational mode in which one or more computing systems are used to navigate and/or maneuver the vehicle with at least some human driver supervision required. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can be configured to be switched between the various operational modes, including between any of the above-described operational modes. Such switching can be implemented in any suitable manner, now known or later developed. The switching can be performed automatically, selectively, or it can be done responsive to receiving a manual input or request.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

The one or more data stores 115 can include sensor data 119. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

Figure 13:
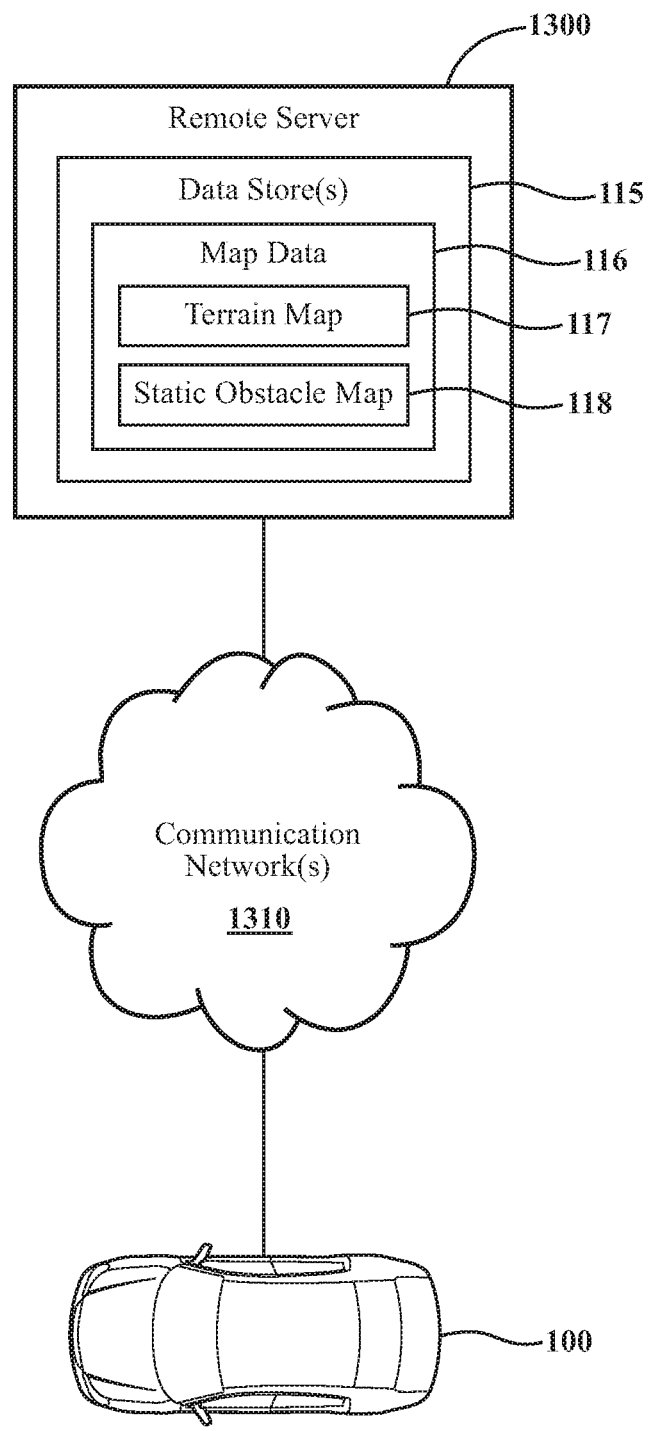
FIG. 13 is an example of the vehicle communicatively linked to a remote server that includes map data.

In some instances, at least a portion of the map data 116 and/or the sensor data 119 can be located in one or more data stores 115 located onboard the vehicle 100. Alternatively or in addition, at least a portion of the map data 116 and/or the sensor data 119 can be located in one or more data stores 115 that are located remote from the vehicle 100. For example, FIG. 13 shows one or more of the data stores 115 being located on a remote server 1300. The remote server 1300 can be communicatively linked to the vehicle 100 through one or more communication networks 1310. The map data 116 and/or the sensor data 119 can be obtained by the vehicle 100 from any suitable source, including a sensor manufacturer, the vehicle manufacturer, and/or based on test data, just to name a few possibilities.

The data store(s) 115 can be communicatively linked to one or more elements of the vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the vehicle 100 itself (e.g., position, orientation, speed, etc.). Alternatively or in addition, the sensor system 120 can include one or more environment sensors 122 configured to acquire, detect, determine, assess, monitor, measure, quantify and/or sense driving environment data. "Driving environment data" includes and data or information about the external environment in which a vehicle is located or one or more portions thereof. For example, the one or more environment sensors 122 can detect, determine, assess, monitor, measure, quantify and/or sense obstacles in at least a portion of the external environment of the vehicle 100 and/or information/data about such obstacles. Such obstacles may be stationary objects and/or dynamic objects. The one or more environment sensors 122 can detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126, and/or one or more ranging sensors. Such sensors can be used to detect, determine, assess, monitor, measure, quantify and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g. in a longitudinal direction, a lateral direction and/or other direction(s)), the elevation of each detected obstacle, the speed of each detected obstacle and/or the movement of each detected obstacle.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed.

The LIDAR sensor 124 can emit at least one outbound sensor signal into the external environment. In some instances, the LIDAR sensor 124 can emit a plurality of outbound sensor signals. In some instances, the outbound sensor signals can be emitted from a common signal source. In other instances, the outbound sensor signals can be emitted from a plurality of signal sources. The outbound sensor signals can be arranged and/or distributed in any suitable manner. In one or more arrangements, the outbound sensor signals can be equally spaced apart. The outbound sensor signals can be emitted in a substantially two-dimensional array, or they can be emitted in a three-dimensional array. In one or more arrangements, the outbound sensor signals can be emitted in a substantially semi-circular array or in a substantially semi-spherical array. Information about the outbound sensor signals can be included in the sensor data 119.

Returning to FIG. 1, the vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include an earphone and/or speaker. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the vehicle 100 or one or more systems thereof (e.g. one or more of vehicle systems 140).

The vehicle 100 can include one or more sensor data analysis modules 170. The sensor data analysis module(s) 170 can analyze data acquired by the sensor system 120, such as the object data points acquired by the LIDAR sensor(s) 124. The sensor data analysis module(s) 170 can detect the presence of obstacles and/or obstacle candidates. The sensor data analysis module(s) 170 can determine the speed and/or the velocity of a detected obstacle and/or obstacle candidate. For instance, in one or more arrangements, the sensor data analysis module(s) 170 can locate the detected obstacle on a static obstacle map 118 in a location based on the location data associated with the detected obstacle. If the location of the detected obstacle overlaps a static obstacle included in the static obstacle map, then the sensor data analysis module(s) 170 can determine that the detected obstacle is a static obstacle. If the location of the detected obstacle does not overlap a static obstacle included in the static obstacle map, then the sensor data analysis module(s) 170 can determine that the detected obstacle is a dynamic obstacle, or it can analyze other sensor data to determine whether the obstacle is a dynamic obstacle or a static obstacle.

In one or more arrangements, the sensor data analysis module(s) 170 can group object data points together to identify one or more obstacle candidates. In one or more arrangements, the sensor data analysis module(s) 170 can apply one or more filters to filter out acquired sensor data. The sensor data analysis module(s) 170 can use any suitable data grouping technique. As an example, the sensor data analysis module(s) 170 can use one or more segmentation techniques, such as a graph-based segmentation algorithm. Some examples of suitable techniques to segment three dimensional point clouds into clusters are described in an article entitled "Efficient Graph-Based Image Segmentation" by P. Felzenszwalb et al., which is incorporated herein by reference. In one or more arrangements, such analyzing can be performed before or after the data points have been filtered out according to one or more filters.

In one or more arrangements, the sensor data analysis module(s) 170 can determine whether the acquired sensor data is occluded. Sensor data can be occluded when at least a portion of the acquired sensor data for an obstacle is obscured by another object, missing, incomplete, and/or otherwise suspect. In one or more arrangements, the sensor data analysis module(s) 170 can set an occluded area based on the location of whether the acquired sensor data is occluded. In such case, the autonomous driving module(s) 160 can determine a driving maneuver for the vehicle 100 with respect to the occluded area.

The vehicle 100 can include one or more ray tracing modules 165. In one or more arrangements, the ray tracing module(s) 165 can generate a projected path for the one or more of the outbound sensor signals transmitted into the external environment by one or more sensors of the sensor system 120. The projected path for the one or more of the outbound sensor signals can be generated using the sensor data 119 and/or data acquired by the sensor system 120. With such information, the projected path can be oriented, arranged, and/or configured to accurately represent the actual outbound sensor signal. The projected path can extend from an origin (e.g., the sensor signal transmitter) to a distance corresponding to the maximum working range of the particular sensor. The projected path can be substantially linear. The projected path can be oriented corresponding to an actual orientation of the outbound sensor signal(s) transmitted from the sensor system 120. Thus, the projected path can accurately represent the actual path of the outbound sensor signal(s) transmitted from the sensor system 120.

The ray tracing module(s) 165 can analyze the projected path relative to map data 116 (e.g., the terrain map(s) 117 and/or the static obstacle map(s) 118). For example, the projected path can be analyzed relative to map data 116 to determine whether the outbound sensor signal, within its maximum working range, should have hit an obstacle in the external environment (e.g., the ground or a static obstacle) which would have resulted in receiving a return sensor signal. For instance, if the projected travel path of the outbound sensor signal intersects with a ground surface defined by the terrain map 117 and/or any portion of a static obstacle defined by the static obstacle map 118, then a return sensor signal would be expected for that outbound sensor signal. If, however, the projected travel path of the outbound sensor signal does not intersect with a ground surface defined by the terrain map 117 and/or any portion of a static obstacle defined by the static obstacle map 118, then a return signal may or may not be received.

A received return signal would be indicative of another obstacle that is not reflected in the map data 116. The lack of a return sensor signal can be indicative of several possibilities. In one instance, the lack of a return signal can indicate a hidden obstacle located in the path of the outbound sensor signal. Examples of hidden obstacles include highly reflective obstacles (e.g., mirror like objects), black obstacles (e.g., objects that absorb sensor signals), and/or an obstacle that otherwise prevents a return signal from being reflected back to the sensor system. A hidden obstacle is one that is effectively invisible to a particular environment sensor (e.g., a LIDAR sensor 124) such that it cannot be detected by that particular environment sensor alone. Alternatively, the lack of a return signal can be indicative of the fact that the outbound sensor signal did not hit any obstacle within its maximum working range. In such case, no obstacle exists on the travel path of the outbound sensor signal (e.g., on the travel path of a LIDAR sensor ray).

The ray tracing module(s) 165 can use ray tracing on the static obstacle map 118. The ray tracing module(s) 165 can determine whether there is a first occluded sensor coverage area located behind a static obstacle included in the static obstacle map. The first occluded sensor coverage area can include the static obstacle itself and can extend in generally the direction of the outbound sensor signal(s) to the maximum working range of the outbound sensor signal(s). The first occluded sensor coverage area can be at least partially bounded by the projected paths of the outbound sensors signals that substantially enclose the static obstacle included on the static obstacle map.

The ray tracing module(s) 165 can use ray tracing on the acquired sensor data. The ray tracing module(s) 165 can determine whether there is a second occluded sensor coverage area located behind a detected dynamic obstacle. As used herein, a "dynamic obstacle" is a physical object whose position changes or substantially changes over a period of time. Examples of dynamic obstacles include moving vehicles, pedestrians, and animals. The second occluded sensor coverage area can include the dynamic obstacle itself and can extend in generally the direction of the outbound sensor signal(s) to the maximum working range of the outbound sensor signal(s). The second occluded sensor coverage area can be bounded by, for example, the projected paths of the outbound sensors signals that substantially enclose the dynamic obstacle.

The vehicle 100 can include one or more secondary occluded area modules 175. In one or more arrangements, the secondary occluded area module(s) 175 can predict whether one or more secondary occluded areas are located behind the dynamic obstacle relative to a current location of the vehicle based on a static obstacle map. Such areas need to be taken into account by the autonomous driving module(s) 160 when the dynamic obstacle is no longer in the way. The secondary occluded area module(s) 175 can compare the first occluded sensor coverage area to the second occluded sensor coverage area. The secondary occluded area module(s) 175 can determine whether there is an overlap between the first occluded sensor coverage area and the second occluded sensor coverage area. If it is determined that there is an overlap between first occluded sensor coverage area and the second occluded sensor coverage area, it can be determined that there is a secondary occluded area. The secondary occluded area can be defined by the overlap between the first occluded sensor coverage area and the second occluded sensor coverage area.

When it is determined that a secondary occluded area is located behind the dynamic obstacle relative to a current location of the vehicle based on the static obstacle map, the secondary occluded area module(s) 175, the autonomous driving module(s) 160, and/or the processor(s) 110 can determine a driving maneuver for the vehicle based on at least the dynamic obstacle and the secondary occluded area. In some instances, the determination of a driving maneuver for the vehicle can also be based on the speed and/or velocity of the dynamic obstacle.

The vehicle 100 can include one or more map update modules 180. In one or more arrangements, the map update module(s) 180 can determine, using a static obstacle map, whether a detected obstacle is located behind an expected location of a static obstacle included in the static obstacle map relative to a current location of the vehicle. Such a determination can be made in any suitable manner. For instance, the map update module(s) 180 can determine, using ray tracing on the static obstacle map, an occluded sensor coverage area located behind a static obstacle included in the static obstacle map. The map update module(s) 180 can determine whether the detected obstacle is located within the occluded sensor coverage area. If it is determined that the detected obstacle is located within the occluded sensor coverage area, the map update module(s) 180 can determine that the detected obstacle is located behind an expected location of a static obstacle included in the static obstacle map relative to a current location of the vehicle.

In such case, the sensor data differs from what was expected to be detected by the sensor data with respect to the static obstacle map 118. As such, it can be indicative that the static obstacle map 118 is not correct. Accordingly, responsive to determining that the location of the obstacle is behind the expected location of a static obstacle included in the static obstacle map relative to the current location of the vehicle, the map update module(s) 180 can update the static obstacle map, cause the static obstacle map to be updated, and/or send a command or request to update the static obstacle map. In this example, the command can be to update the static obstacle map by removing the static obstacle. The command can be implemented automatically so that the static obstacle map can be updated in real-time, or the command can be implemented at any suitable time and/or with respect to one or more predetermined conditions (e.g., approval by a vehicle occupant or other entity, a predetermined number of such commands for the same location, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150 to modify, adjust and/or alter one or more of the vehicle systems 140 or components thereof to responsive to receiving signals or other inputs from the processor(s) 110 and/or the autonomous driving module(s) 160. The one or more actuators 150 can include motors, pneumatic actuators, hydraulic pistons, relays, solenoids, and/or piezoelectric actuators, just to name a few possibilities.

Figure 2:
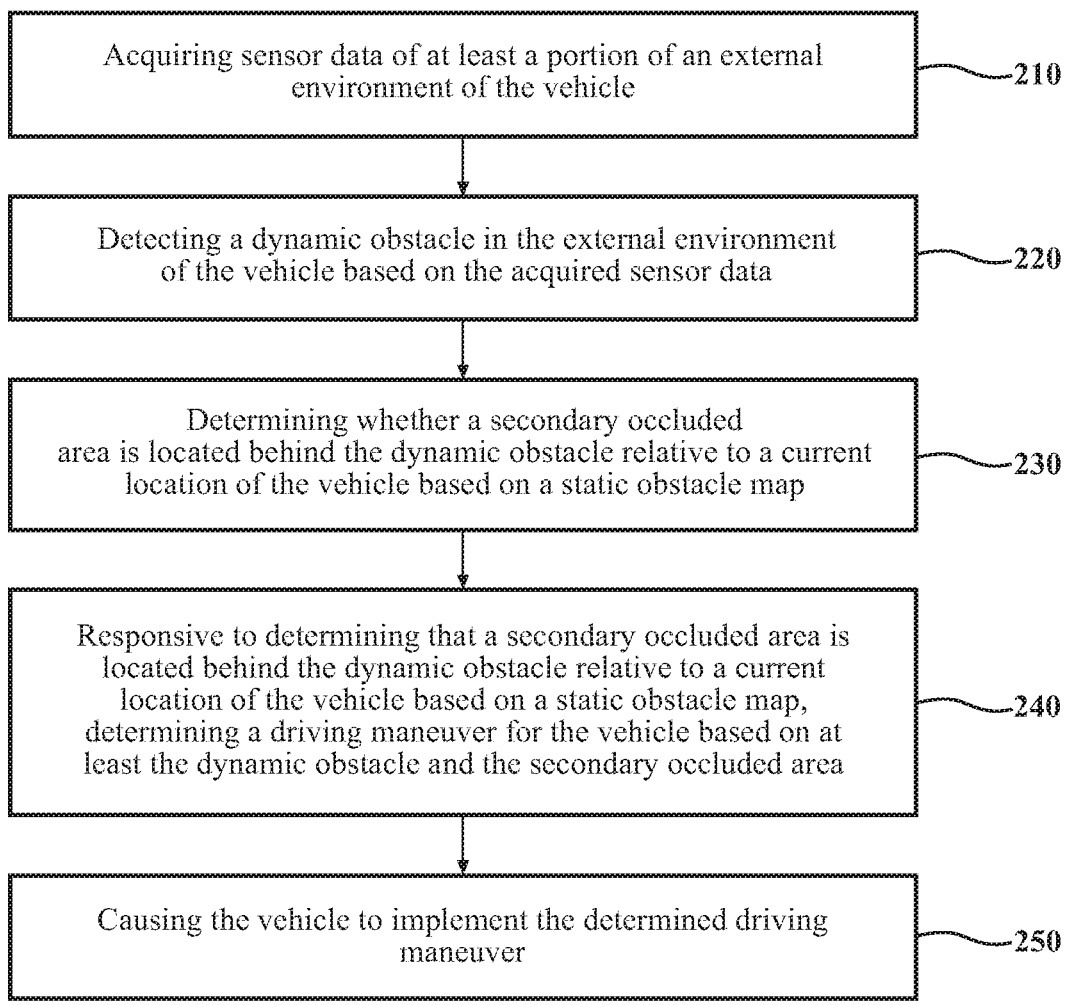
FIG. 2 is an example of a method of operating the vehicle with respect to a secondary occluded area.

Now that the various potential systems, devices, elements and/or components of the vehicle 100 have been described, various methods of detecting hidden obstacles using ray tracing will now be described. Referring now to FIG. 2, an example of a method of operating a vehicle is shown. Various possible steps of such methods will now be described. The method 200 illustrated in FIG. 2 may be applicable to the arrangements described above in relation to FIG. 1, but it is understood that the method 200 can be carried out with other suitable systems and arrangements. Moreover, the method 200 may include other steps that are not shown here, and in fact, the method 200 is not limited to including every step shown. The blocks that are illustrated here as part of the method 200 are not limited to the particular chronological order. Indeed, some of the blocks may be performed in a different order than what is shown and/or at least some of the blocks shown can occur simultaneously.

At block 210, sensor data of at least a portion of an external environment of the vehicle can be acquired. For instance, one or more sensors can transmit one or more outbound sensor signals into the external environment of the vehicle. For instance, the outbound sensor signal(s) can be transmitted by one or more environment sensors 122 of the sensor system 120. As an example, the outbound sensor signal(s) can be transmitted by a LIDAR sensor 124, such as by a transmitter or a transceiver of the LIDAR sensor 124. Return signals can be received for at least some of the outbound sensor signals. The return signal(s) can be received by a receiver or a transceiver of the LIDAR sensor 124 or other environment sensor(s) 122. The method 200 can continue to block 220.

At block 220, a dynamic obstacle in the external environment of the vehicle can be determined based on the acquired sensor data. For instance, the acquired sensor data can be analyzed by the sensor system 120 and/or the processor(s) 110 to detect an obstacle in the external environment and whether the obstacle is moving. In one or more arrangements, a velocity of the dynamic obstacle can be determined based on the acquired sensor data. The determination of whether an obstacle is a dynamic obstacle can be performed in any suitable manner, now known or later developed. For instance, an obstacle can be detected in the acquired sensor data, which can include location data for the detected obstacle. The detected obstacle can be located on the static obstacle map based on the location data. If the location of the detected obstacle overlaps a static obstacle included in the static obstacle map, it can be determined that the detected obstacle is a static obstacle. If the location of the detected obstacle does not overlap a static obstacle included in the static obstacle map, it can be determined that the detected obstacle is a dynamic obstacle. The method can continue to block 230.

At block 230, it can be determined whether a secondary occluded area is located behind the dynamic obstacle relative to a current location of the vehicle based on a static obstacle map. Such a determination can be made in response to detecting a dynamic obstacle in the external environment of the vehicle based on the acquired sensor data. Such a determination can be performed by the secondary occluded area module(s) 175, the ray tracing module(s) 165, and/or the processor(s) 110. The determination can be made with respect to map data 116, such as the static obstacle map 118. In one or more arrangements, the determination can also be made with respect to the terrain map 117. The determination can be made in any suitable manner. A projected path of the outbound sensor signal can be generated using sensor data 119 and/or other data acquired by the sensor system 120. The projected path of the outbound sensor signal can be compared to the static obstacle map 118 to determine whether the projected path of the outbound sensor signal intersects with a static obstacle included in the static obstacle map 118. However, if a particular outbound sensor signal did not actually impinge upon the static obstacle indicated in the static obstacle map, but instead impinged upon a dynamic obstacle located in front of the static obstacle relative to the current location of the vehicle, then it can be determined that there is a secondary occluded area is located behind the dynamic obstacle relative to a current location of the vehicle. On the other hand, if the projected path of the outbound sensor signal does not intersect with a static obstacle included in the static obstacle map 118, then it can be determined that a secondary occluded area is not located behind the dynamic obstacle relative to a current location of the vehicle. The method 200 can continue to block 240.

At block 240, responsive to determining that a secondary occluded area is located behind the dynamic obstacle relative to a current location of the vehicle based on a static obstacle map, a driving maneuver for the vehicle 100 based on at least the dynamic obstacle and the secondary occluded area. For instance, the driving maneuver may be reducing the speed of the vehicle to a reduced speed until the dynamic obstacle is no longer located between the secondary occluded area and the vehicle. In some instances, after the dynamic obstacle is no longer located between the secondary occluded area and the vehicle, the reduced speed of the vehicle can be maintained at least until the secondary occluded area is detectable by the sensor system 120. The driving maneuver can be determined by the processor(s) 110, the secondary occluded area module(s) 175, and/or the autonomous driving module(s) 160. The method 200 can continue to block 250.

At block 250, the vehicle 100 can be caused to implement the determined driving maneuver. The vehicle 100 can be caused to implement the determined driving maneuver in any suitable manner. In one or more arrangements, the processor(s) 110, secondary occluded area module(s) 175, and/or the autonomous driving module(s) 160 can cause the vehicle 100 to implement the driving maneuver. The processor(s) 110, the secondary occluded area module(s) 175, and/or the autonomous driving module(s) 160 can be operatively connected to one or more of the vehicle systems 140 to implement the determined driving maneuver. In one or more arrangements, the processor(s) 110, the secondary occluded area module(s) 175, and/or the autonomous driving module(s) 160 can be operable to control the one or more actuators 150, which can control one or more of the vehicle systems 140 or portions thereof to implement the determined driving maneuver.

When the vehicle 100 is caused to implement the driving maneuver, the method 200 can end. Alternatively, the method 200 can return to block 210 or some other block. In one or more arrangements, the method 200 can further include determining driving maneuvers after the dynamic obstacle is no longer located between the vehicle 100 and the secondary occluded area. In such case, sensor data of the secondary occluded area can be acquired, such as by one or more environment sensors 122 of the sensor system 120. It can be detected whether one or more other obstacles are located in the secondary occluded area based on the acquired sensor data of the secondary occluded area. The one or more other obstacles can include static obstacles and/or dynamic obstacles. Responsive to detecting that one or more other obstacles are located in the secondary occluded area, a second driving maneuver for the vehicle 100 can be determined. The second driving maneuver can be different from the first driving maneuver. The vehicle can be caused to implement the determined second driving maneuver.

Further, the method 200 can include determining whether a hidden obstacle is located in the external environment so as to occlude a portion of at least one of the dynamic obstacle or the secondary occluded area. In some arrangements, determining whether there is a secondary occluded area located behind the dynamic obstacle relative to a current location of the vehicle based on a static obstacle map can be performed responsive to determining that no hidden obstacle is located in the external environment so as to occlude a portion of at least one of the dynamic obstacle or the secondary occluded area. However, responsive to determining that a hidden obstacle is located in the external environment so as to occlude a portion of at least one of the dynamic obstacle or the secondary occluded area, the method can include determining an occluded area for the hidden obstacle, determining a second driving maneuver for the vehicle based on at least the determined occluded area for the hidden obstacle, and causing the vehicle to implement the determined second driving maneuver.

A non-limiting example of the operation of the vehicle 100 and/or the method 200 will now be described in relation to FIG. 3-7. The vehicle 100 can be traveling in an environment 300. The vehicle 100 can be traveling in a first direction 301 on a road 302. There can be one or more static obstacles 315 (e.g., trees 316) located in the environment 300. The vehicle 100 can include the static obstacle map 118 for the environment 300. The static obstacle map 118 can be located onboard the vehicle 100 or located in a remote source (e.g., a remote server) to which the vehicle 100 is communicatively linked.

The vehicle 100 can have a planned path, which includes turning left onto a road 303. However, in this driving scenario, there can be a second vehicle 320 located in the environment 300. The second vehicle 320 can be traveling in a second direction 304 that is transverse to the first direction 301. The second vehicle 320 can be located behind the trees 316 relative to the vehicle 100. In such case, the second vehicle 320 would not be detected by the vehicle 100 because it would be occluded by the trees 316.

Further, there is a third vehicle 350 located in the environment 300. The third vehicle 350 can be traveling on the road 302 in a third direction 305 that is generally opposite to the first direction 301. At some moments in time, the third vehicle 310 can be located between the trees 316 and the vehicle 100.

The vehicle 100 can sense the environment 300. For example, the vehicle 100 can sense the environment 300 using, for example, one or more LIDAR sensors 124. The LIDAR sensor 124 can emit a plurality of outbound LIDAR signals. The vehicle 100 can detect the presence of the third vehicle 350 (a dynamic obstacle) based on the return LIDAR signals or other return sensor signals. In one or more arrangements, a position and/or velocity of the dynamic obstacle can be determined based on the acquired sensor data in any suitable manner. It will be appreciated that, at the moment in time shown in FIG. 3, the sensor system 120 of the vehicle 100 will not be able to detect all of the trees 316 because they are occluded by the third vehicle 350. However, the vehicle 100 can determine whether a secondary occluded area is located behind the third vehicle 350 relative to a current location of the vehicle 100 based on the static obstacle map 118, as the vehicle 100 can take into account any such secondary occluded area after the third vehicle 350 has moved out of the way.

The vehicle 100 can use ray tracing with respect to static obstacles included in the static obstacle map 118. FIG. 4 is an example of using ray tracing on the static obstacle map 118 for the current location of the vehicle in the driving scenario of FIG. 3. FIG. 4 shows what the sensor system 120 of the vehicle 100 would be expected to detect using the static obstacle map 118 corresponding to the current location of the vehicle 100. The static obstacle map 118 can include the trees 316. A bounding box 417 may be included on the map to enclose the representation of trees 316 at, for example, their maximum dimensions. A projected path 460 for each of the outbound sensor signals can be overlaid upon and/or otherwise compared to the static obstacle map 118. The projected path 460 of some of the outbound sensor signals are predicted to not intersect with any static obstacles included in the static obstacle map 118. In such case, no return sensor signal would be expected. A first occluded sensor coverage area 490 can be determined due to the presence of the static obstacles included in the static obstacle map 118. The first occluded sensor coverage area 490 can include the static obstacles (e.g., the trees 316 and/or their bounding boxes 417). The first occluded sensor coverage area 490 can be the area located behind the static obstacles relative to the current location of the vehicle 100. In one or more arrangements, the first occluded sensor coverage area 490 can be defined at least in part by, for example, the lateral-most projected paths 460 that substantially enclose the static obstacles, as is shown in FIG. 4. The first occluded sensor coverage area 490 can be defined at least in part by, for example, at least a portion of the one or more static obstacles included in the static obstacle map 118, as is shown in FIG. 4. The first occluded sensor coverage area 490 can be defined by, for example, the maximum working range of the outbound sensor signal(s) as reflected by the projected paths 460 for the outbound sensor signals.

Figure 5:
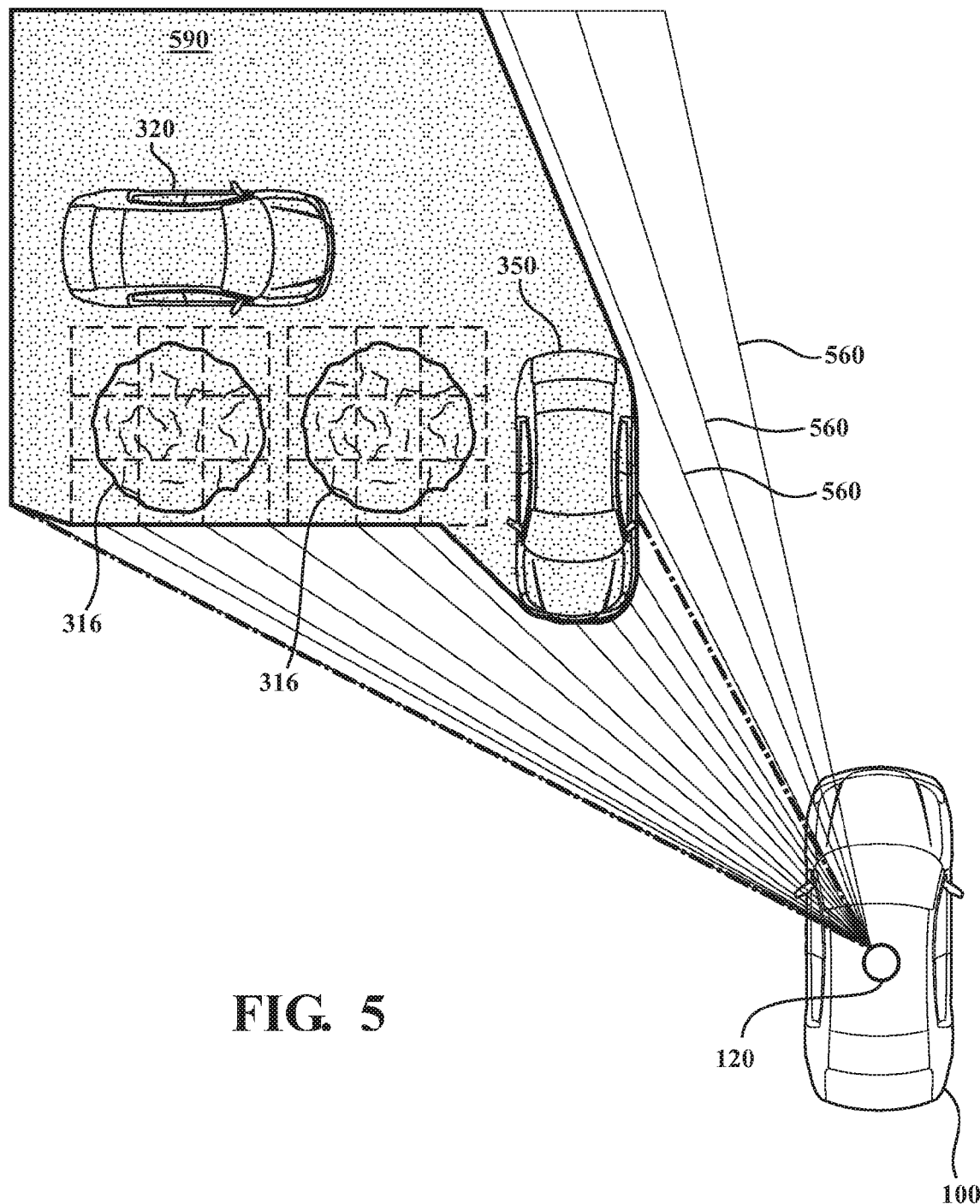
FIG. 5 is an example of using ray tracing on acquired sensor data for the current location of the vehicle in the driving scenario of FIG. 3, showing a second occluded area due to dynamic obstacles and static obstacles included in the acquired sensor data.

The vehicle 100 can use ray tracing with respect to obstacles included in the acquired sensor data. FIG. 5 is an example of using ray tracing on acquired sensor data for the current location of the vehicle in the driving scenario of FIG. 3. The acquired sensor data can include the trees 316 and the third vehicle 350; however, the second vehicle 320 is not detected. By applying ray tracing, the projected path 560 for at least some of the outbound sensor signals is shown. The projected path of some of the outbound sensor signals are predicted to intersect with the representation of the trees 316 and the third vehicle 350, as defined by the sensor data. In such case, a return sensor signal would be expected. The projected path 560 can terminate at any point of intersection. The projected path 560 of some of the outbound sensor signals are predicted to not intersect with any obstacles included in the acquired sensor data. In such case, no return sensor signal would be expected. A second occluded sensor coverage area 590 can be determined due to the presence of the static and/or dynamic obstacles included in the acquired sensor data. Here, the second occluded sensor coverage area 590 can include the static obstacles (e.g., the trees 316) and dynamic obstacles (e.g., the third vehicle 350). The second occluded sensor coverage area 590 can be the area located behind the static obstacles and the dynamic obstacles relative to the current location of the vehicle 100. The second occluded sensor coverage area 590 can be defined by the projected paths 560 of the lateral-most outbound signals that substantially enclose the static obstacles, as is shown in FIG. 5.

Figure 6:
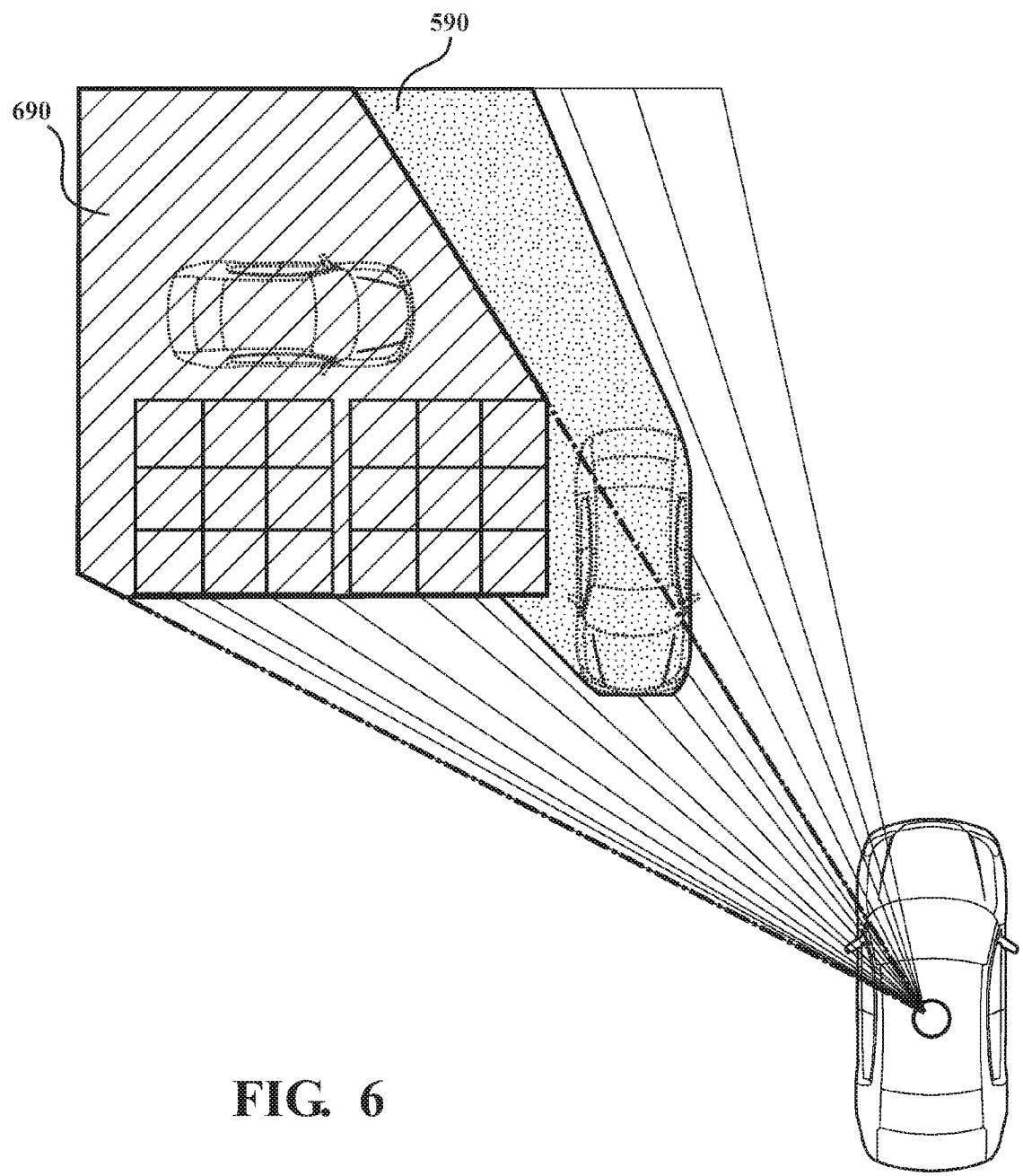
FIG. 6 is an example of a secondary occluded area in the driving scenario of FIG. 3, the secondary occluded area being defined by an overlap between the first occluded area and the second occluded area.

The vehicle 100 can determine whether a secondary occluded area is located behind the dynamic obstacle relative to a current location of the vehicle 100. The vehicle 100 can make such a determination in any suitable manner. In this example, the first occluded sensor coverage area 490 can be compared to the second occluded sensor coverage area 590 to determine whether there is an overlap between the first occluded sensor coverage area 490 and the second occluded sensor coverage area 590. The secondary occluded area can be defined by an overlap between the first occluded sensor coverage area 490 and the second occluded sensor coverage area 590. FIG. 6 shows an example of a secondary occluded area 690 for the driving scenario of FIG. 3.

Responsive to this determination, a driving maneuver can be determined for the vehicle 100 based on at least the third vehicle 350 and the secondary occluded area 690, and the vehicle 100 can be caused to implement the determined driving maneuver, as described above. For instance, the driving maneuver may be continuing the current driving maneuver in a more conservative manner. For example, the driving maneuver may be a reduction in speed. The driving maneuver can be determined by the processor(s) 110, the secondary occluded area module(s) 175, and/or the autonomous driving module(s) 160. In this example, the driving maneuver can be a reduction in the speed of the vehicle 100. Such a reduction in speed can be implemented at least until the third vehicle 350 is no longer located between the secondary occluded area and the vehicle. After the dynamic obstacle (the third vehicle 350) is no longer located between the secondary occluded area 690 and the vehicle 100, the reduced speed of the vehicle can be maintained at least until the secondary occluded area is detectable by the sensor system 120.

When the third vehicle is no longer located between the vehicle 100 and the trees 316 and the vehicle 100 has traveled forward on the road 302, the secondary occluded area 690 can become detectable by the vehicle 100. In such case, the vehicle 100 can detect the presence of the second vehicle 320. The autonomous driving module(s) and/or the processor(s) 110 of the vehicle 100 can determine an appropriate driving maneuver for the vehicle 100 relative to the second vehicle 320.

It should be noted that, in some instances, the driving maneuver can include a recommended vehicle speed. In such case, the vehicle 100 can cause the recommended vehicle speed to be presented to an occupant of the vehicle 100, such as on a display within the vehicle 100 and/or by an audio output. In some instances, the recommended vehicle speed can be presented without changing the current speed of the vehicle 100. In such instances, the driver can determine whether or not to implement the recommended vehicle speed. For instance, the driver can manually operate the vehicle 100 to the recommended vehicle speed, or the driver can send a command to cause the vehicle to implement the recommended vehicle speed. Alternatively, the driver may choose to ignore the recommended vehicle speed.

Figure 3:
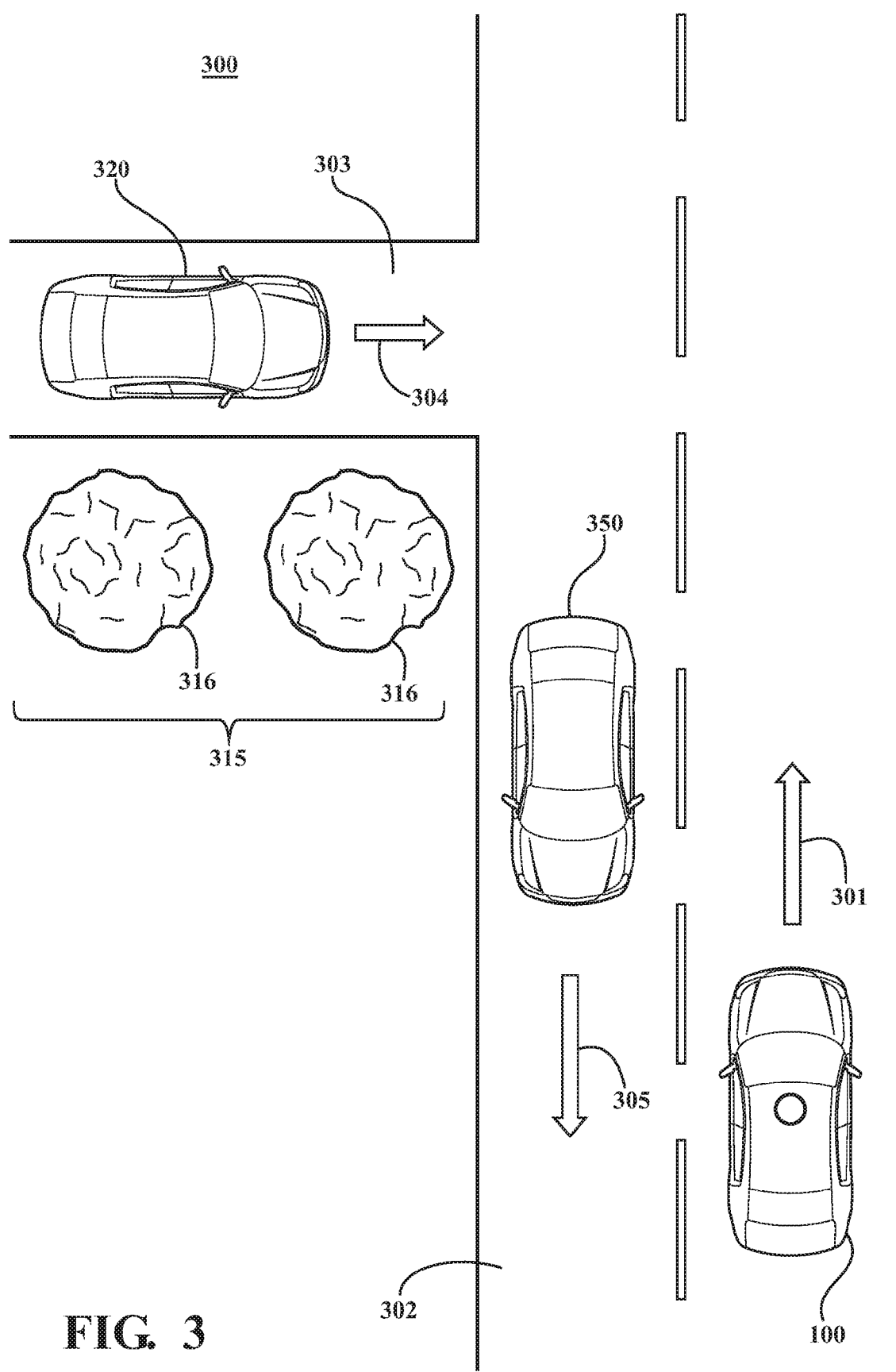
FIG. 3 is an example of a driving scenario in which a dynamic obstacle is located between the vehicle and a static obstacle.
Figure 4:
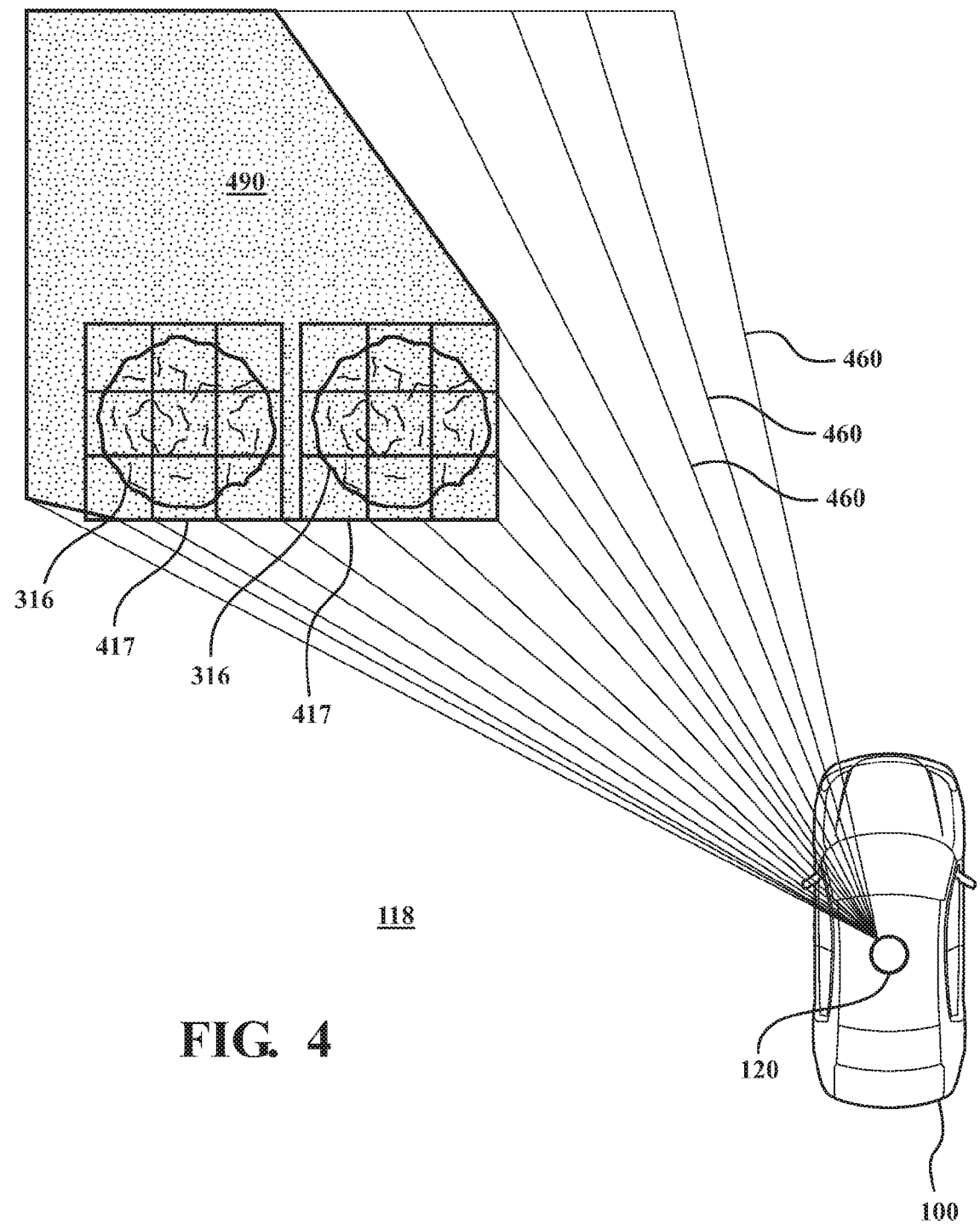
FIG. 4 is an example of using ray tracing on a static obstacle map for the current location of the vehicle in the driving scenario of FIG. 3, showing a first occluded area due to a static obstacle included in the static obstacle map.
Figure 7:
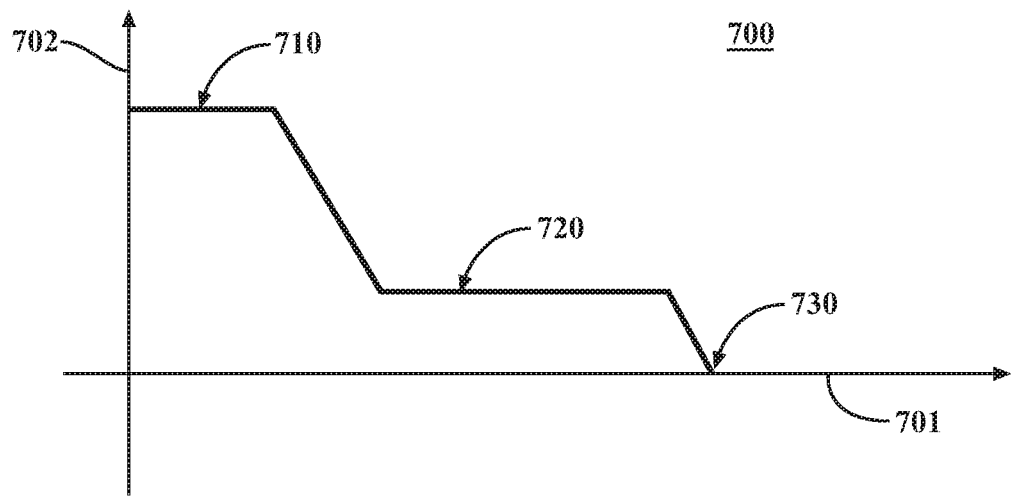
FIG. 7 is an example of a speed profile for the vehicle during the scenario in FIG. 3, wherein the dynamic obstacle and the secondary occluded area are used in determining a driving maneuver for the vehicle.

FIG. 7 is an example of a speed profile 700 for the vehicle in the scenario presented above in connection with FIG. 3 and in which the dynamic obstacle and the secondary occluded area are used in determining a driving maneuver for the vehicle. In the speed profile 700, the x-axis 701 represents time, and the y-axis 702 represents vehicle speed. The vehicle 100 can be traveling at an initial speed 710. The vehicle 100 can detect the detected dynamic obstacle (e.g., third vehicle 350). The vehicle 100 can determine an appropriate driving maneuver to be reducing the speed of the vehicle 100 to a first reduced speed 720, and the vehicle 100 can cause the determined driving maneuver to be implemented. Using the static obstacle map 118, the vehicle 100 can determine that there is a secondary occluded area 690 located behind the third vehicle 350.

The third vehicle 350 can eventually pass the vehicle 100 such that the third vehicle 350 is no longer located between the vehicle 100 and the secondary occluded area 690. However, since the vehicle 100 has determined that there is a secondary occluded area 690, the vehicle 100 can maintain the first reduced speed 720 until the secondary occluded area 690 can be detected by the sensor system 120 of the vehicle 100. When the secondary occluded area 690 is detected, another driving maneuver for the vehicle 100 can be determined. In the example above, the second vehicle 320 is located in the secondary occluded area 690. Therefore, when the second vehicle 320 is detected by the vehicle 100, the driving maneuver can be a further reduction in the speed of the vehicle 100 to a second reduced speed 730. In this example, the second reduced speed 730 can be zero. It will be appreciated that the reduction of the vehicle speed to the second reduced speed can be done smoothly because the speed of the vehicle 100 was maintained at the first reduced speed 720 after the third vehicle 350 passed.

Figure 8:
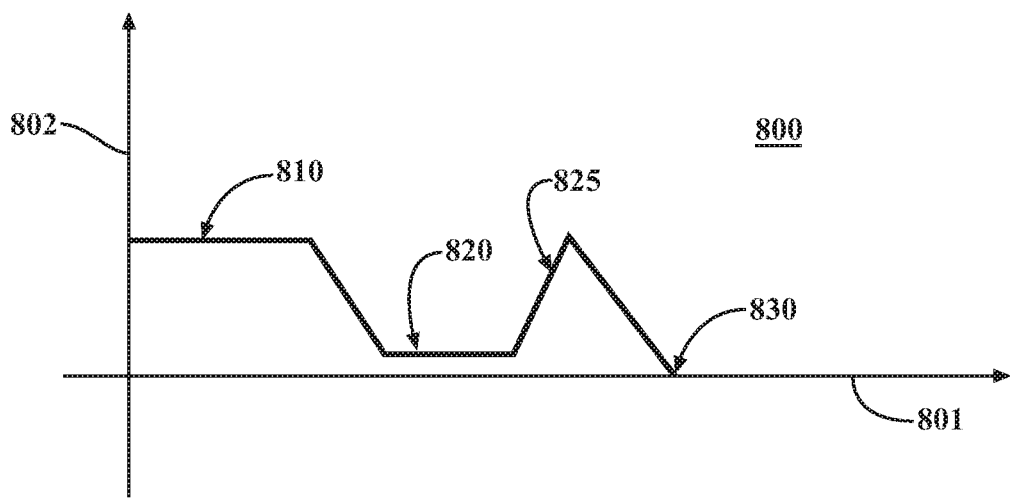
FIG. 8 is an example of a speed profile for the vehicle during the scenario in FIG. 3, wherein the secondary occluded area is not used in determining a driving maneuver for the vehicle.

In contrast, FIG. 8 is an example of a speed profile 800 for the in the scenario presented above in connection with FIG. 3 and in which the secondary occluded area 690 is not used in determining a driving maneuver for the vehicle 100. In such case, the vehicle 100 can determine an occluded area caused by dynamic obstacles as free space and can cause the vehicle 100 to continue on its planned path even if there is an occluded area behind the dynamic obstacle. In the speed profile 800, the x-axis 801 represents time, and the y-axis 802 represents vehicle speed. Initially, the vehicle 100 is traveling at a first speed 810. The first speed 810 in FIG. 8 can be the same as the initial speed 710 in FIG. 7. The vehicle 100 can detect the dynamic obstacle (e.g., third vehicle 350), and the vehicle 100 can define an occlusion area in the external environment based on the third vehicle 350. The vehicle 100 can determine an appropriate driving maneuver (e.g., reducing the speed of the vehicle 100 to the first reduced speed 820) and can cause the determined driving maneuver to be implemented. In this example, the first reduced speed 820 in FIG. 8 can be the same as the first reduced speed 720 in FIG. 7.

The third vehicle 350 eventually passes the vehicle 100. However, in this example, the vehicle does not account for a secondary occluded area. As a result, the vehicle 100 would determine the driving maneuver to be increasing the vehicle speed as soon as the third vehicle 350 passes, and it cause the vehicle to accelerate 825. However, the vehicle 100 will eventually detect the second vehicle 320 located in the secondary occluded area 690. When it does, the vehicle 100 will determine another driving maneuver. In this instance, the driving maneuver would be a reduction in the speed of the vehicle 100 to a second reduced speed 830. The second reduced speed 830 can be zero (e.g., a complete stop). However, since the vehicle 100 was already in the process of accelerating, reducing the speed of the vehicle 100 to the second reduced speed 830 would occur suddenly and sharply. Thus, the operation of the vehicle 100 is not smooth.

Figure 9:
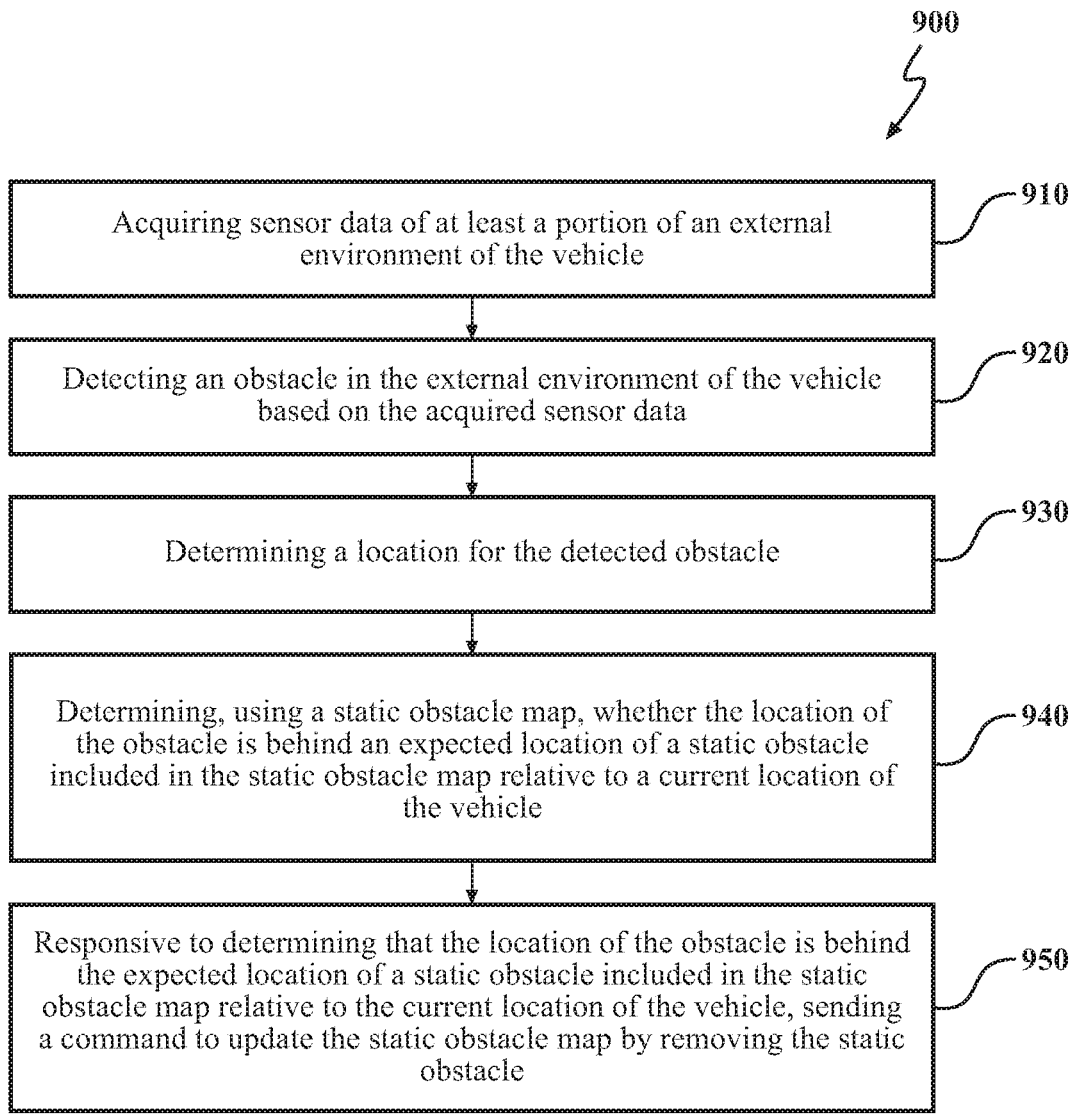
FIG. 9 is an example of a method of updating a static obstacle map.

Referring now to FIG. 9, an example of a method of updating a static obstacle map is shown. Various possible steps of such methods will now be described. The method 900 illustrated in FIG. 9 may be applicable to the arrangements described above in relation to FIG. 1, but it is understood that the method 900 can be carried out with other suitable systems and arrangements. Moreover, the method 900 may include other steps that are not shown here, and in fact, the method 900 is not limited to including every step shown. The blocks that are illustrated here as part of the method 900 are not limited to the particular chronological order. Indeed, some of the blocks may be performed in a different order than what is shown and/or at least some of the blocks shown can occur simultaneously.

At block 910, sensor data of at least a portion of an external environment of the vehicle can be acquired. For instance, one or more sensors can transmit one or more outbound sensor signals into the external environment of the vehicle. For instance, the outbound sensor signal(s) can be transmitted by one or more environment sensors 122 of the sensor system 120. As an example, the outbound sensor signal(s) can be transmitted by a LIDAR sensor 124, such as by a transmitter or a transceiver of the LIDAR sensor 124. Return signals can be received for at least some of the outbound sensor signals. The return signal(s) can be received by a receiver or a transceiver of the LIDAR sensor 124 or other environment sensor(s) 122. The method 900 can continue to block 920.

At block 920, an obstacle in the external environment of the vehicle 100 can be determined based on the acquired sensor data. For instance, the acquired sensor data can be analyzed by the sensor system 120, the processor(s) 110, and/or one or more modules(s) to detect an obstacle in the external environment. The obstacle can be a static obstacle or a moving obstacle. The method 900 can continue to block 930.

At block 930, a location for the detected obstacle can be determined. The location can be determined based on the acquired sensor data, which can include location data. For instance, the acquired sensor data can be analyzed by the sensor system 120, the processor(s) 110, and/or one or more modules(s) to determine the location of the obstacle in the external environment. The method 900 can continue to block 940.

At block 940, it can be determined whether the location of the obstacle is behind an expected location of a static obstacle included in the static obstacle map relative to a current location of the vehicle. Such a determination can be made using a static obstacle map. The detected obstacle can be located on the static obstacle map based on the location data. The vehicle 100 can be located on the static obstacle map based on data obtained from the sensor system 120. Such a determination can be performed by the map update module(s) 180, the ray tracing module(s) 165, the secondary occluded area module(s) 175, and/or the processor(s) 110. The method 900 can continue to block 950.

At block 950 responsive to determining that the location of the obstacle is behind the expected location of a static obstacle included in the static obstacle map relative to the current location of the vehicle, a command to update the static obstacle map can be sent. The command can be to remove the static obstacle from the static obstacle map. The update can be performed automatically or responsive to user approval or some other event (e.g., receiving a predetermined number of commands to remove the static obstacle from the static obstacle map). The command can be sent by the processor(s) 110, the map update module(s) 180, and/or the autonomous driving module(s) 160. The method 900 can end. Alternatively, the method 900 can return to block 910 or some other block.

Figure 10:
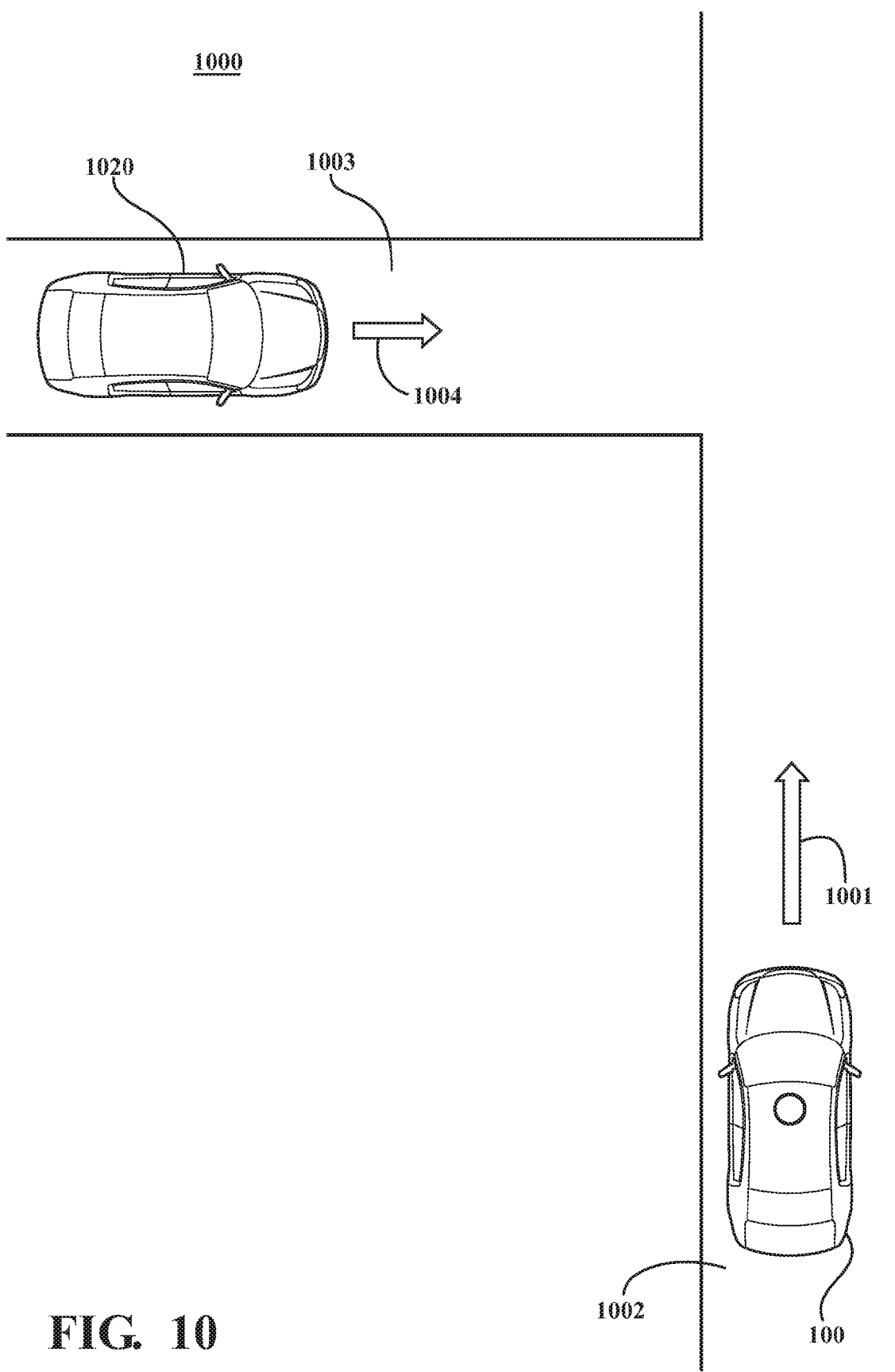
FIG. 10 is an example of a driving scenario.

A non-limiting example of the operation of the vehicle 100 and/or the method 900 will now be described in relation to FIGS. 10-12. Referring to FIG. 10, the vehicle 100 can be traveling in an environment 1000. The vehicle 100 can be traveling in a first direction 1001 on a road 1002. The vehicle 100 can include the static obstacle map 118 for the environment 1000. The static obstacle map 118 can be located onboard the vehicle 100 or located in a remote source (e.g., a remote server) to which the vehicle 100 is communicatively linked.

A second vehicle 1020 can be located in the environment 1000. The second vehicle 1020 can be traveling on a road 1003 in a second direction 1004 that is transverse to the first direction 1001. The vehicle 100 can sense the environment 1000. For example, the vehicle 100 can sense the environment 1000 using, for example, one or more LIDAR sensors 124.

The vehicle 100 can use ray tracing with respect to static obstacles included in the static obstacle map 118. FIG. 11 is an example of using ray tracing on the static obstacle map 118 for the current location of the vehicle in the driving scenario of FIG. 10. In this particular example, the static obstacle map 118 is outdated, as it includes several static obstacles that are no longer present in the environment 1000. Specifically, the static obstacle map 118 includes trees 1116 and associated bounding boxes 1117.

Figure 11:
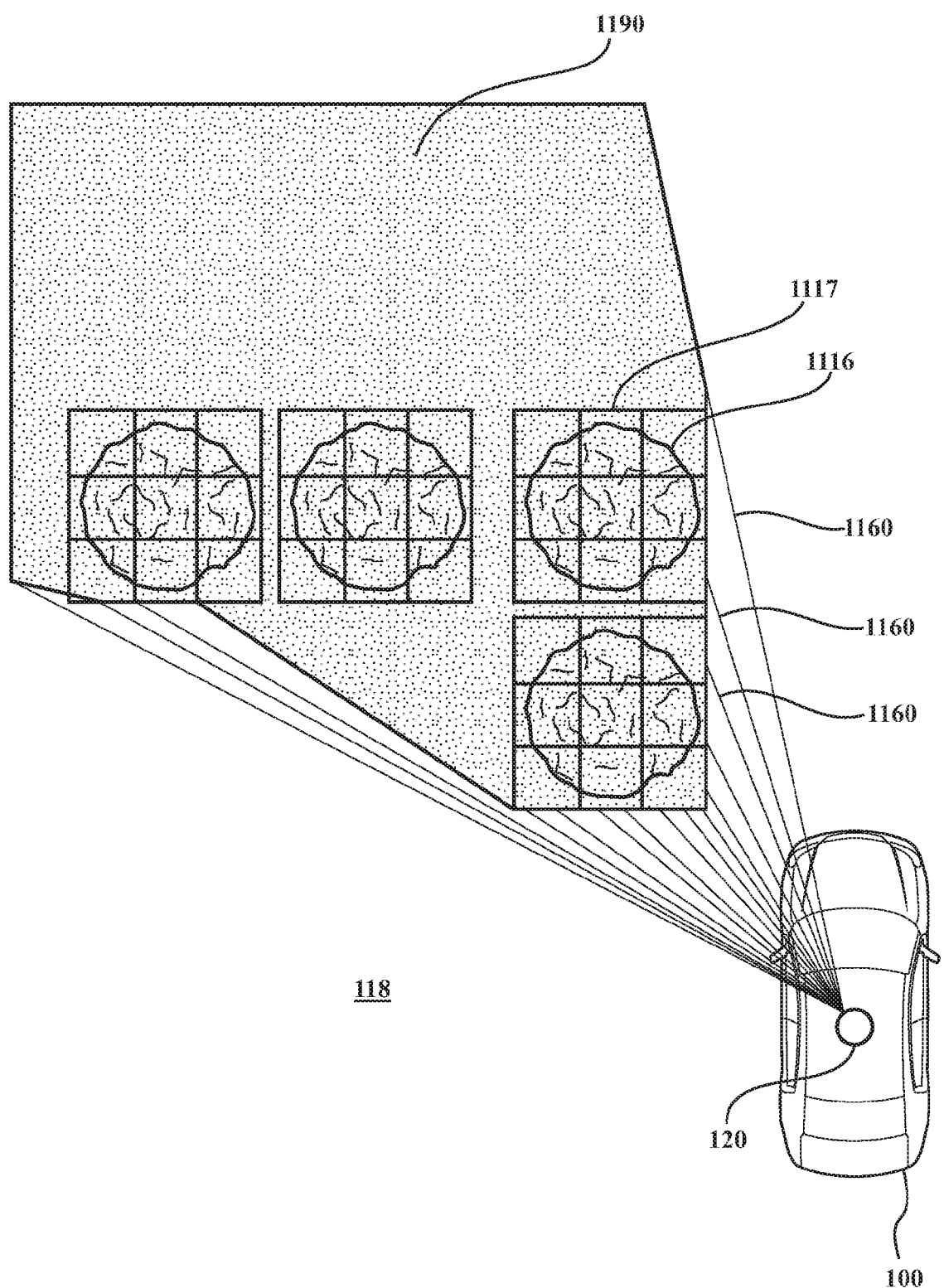
FIG. 11 is an example of using ray tracing on a static obstacle map for the current location of the vehicle in the driving scenario of FIG. 10, showing a plurality of static obstacles included in the static obstacle map.
Figure 12:
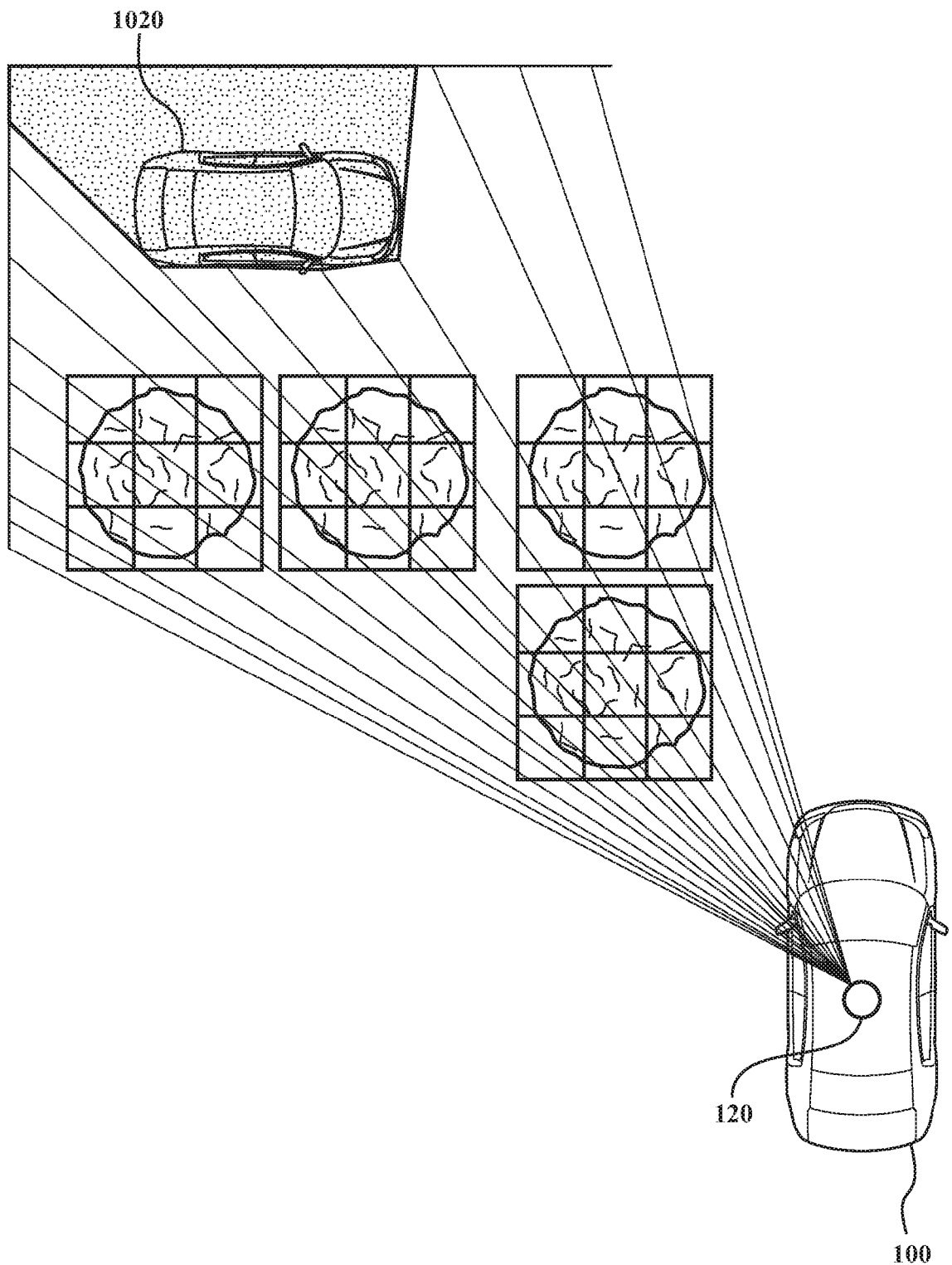
FIG. 12 is an example of sensor data acquired for the current location of the vehicle in the driving scenario of FIG. 10, showing the outbound sensor signals passing through expected static obstacles and impinging upon an obstacle located behind the expected static obstacles.

FIG. 11 shows what the sensor system 120 of the vehicle 100 would be expected to detect using the static obstacle map 118 corresponding to the current location of the vehicle 100. A projected path 1160 for each of the outbound sensor signals can be overlaid upon and/or otherwise compared to the static obstacle map 118. The projected path 1160 of some of the outbound sensor signals are predicted to not intersect with any static obstacles included in the static obstacle map 118. In such case, no return sensor signal would be expected. A first occluded area 1190 can be determined due to the presence of the static obstacles included in the static obstacle map 118. The first occluded area 1190 can include the static obstacles (e.g., the trees 1116 and/or their bounding boxes 1117). The first occluded area 1190 can be the area located behind the static obstacles relative to the current location of the vehicle 100. The first occluded area 1190 can be defined by the lateral-most projected paths 1160 that substantially enclose the static obstacles, as is shown in FIG. 11.

However, in this example, the outbound sensor signals that would be expected to impinge upon a static obstacle (e.g., trees 1116) do not actually impinge upon the static obstacle indicated in the static obstacle map. Instead, the outbound sensor signals impinge upon the second vehicle 1020, as is shown in FIG. 12. The return sensor signals can include location data for the second vehicle 1020. Thus, it can be determined that there is an obstacle located behind the expected location of a static object relative to a current location of the vehicle 100. Responsive to this determination, it can be determined that the expected static obstacles included in the static obstacle map 118 are no longer present in the environment 1000. The determinations can be determined by the processor(s) 110, the secondary occluded area module(s) 175, and/or the autonomous driving module(s) 160.

A command can be sent to update the static obstacle map 118. In some instances, the command can be automatically implemented. However, in other instances, the command may not be implemented until approved by a user or other entity. The command can be generated, sent, and/or implemented by the map update module(s) 185.

A driving maneuver can be determined for the vehicle 100 based on at least the second vehicle 1020. The vehicle 100 can be caused to implement the determined driving maneuver.

It will be appreciated that arrangements described herein can provide numerous benefits, including one or more of the benefits mentioned herein. For example, arrangements described herein can improve the performance and/or safety of a vehicle. Arrangements described here can facilitate the smooth operation of a vehicle in environments with secondary occluded areas. Arrangements described herein can avoid or minimize sudden, unnecessary, and/or drastic vehicle actions (e.g., lane shifts, lane changes or vehicle stops) due to the presence of obstacles hidden in the secondary occluded areas. Arrangements described herein can provide an efficient manner of detecting secondary occluded areas. Arrangements described herein can determine appropriate driving maneuvers for a vehicle relative to any secondary occluded areas. Arrangements described herein can provide better occlusion state prediction by using static obstacle map. Arrangements described herein can detect when the static obstacle maps should be updated and cause such updates to be implemented.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating a vehicle, the method comprising:
   acquiring sensor data, using one or more sensors, of at least a portion of an external environment of the vehicle;
   detecting a dynamic obstacle in the external environment of the vehicle based on the acquired sensor data;
   determining, using a processor, whether a secondary occluded area is located behind the dynamic obstacle relative to a current location of the vehicle based on a static obstacle map;
   responsive to determining that a secondary occluded area is located behind the dynamic obstacle relative to a current location of the vehicle based on the static obstacle map, determining a driving maneuver for the vehicle based on at least the dynamic obstacle and the secondary occluded area; and
   causing the vehicle to implement the determined driving maneuver.

2. The method of claim 1, further including:
   determining a velocity of the dynamic obstacle based on the acquired sensor data, and wherein determining a driving maneuver for the vehicle is further based on the determined velocity of the dynamic obstacle.

3. The method of claim 1, wherein determining whether the secondary occluded area is located behind the dynamic obstacle relative to the current location of the vehicle based on the static obstacle map includes:
  determining, using ray tracing on the static obstacle map, whether there is a first occluded sensor coverage area located behind a static obstacle included in the static obstacle map;
  determining, using ray tracing on the acquired sensor data, whether there is a second occluded sensor coverage area located behind the detected dynamic obstacle;
  responsive to determining that there is a first occluded sensor coverage and a second occluded sensor coverage area, comparing the first occluded sensor coverage area to the second occluded sensor coverage area to determine whether there is an overlap between the first occluded sensor coverage area and the second occluded sensor coverage area; and
  responsive to determining that there is an overlap between first occluded sensor coverage area and the second occluded sensor coverage area, determining that there is a secondary occluded area, wherein the secondary occluded area is defined by the overlap.

4. The method of claim 1, wherein the one or more sensors are one or more LIDAR sensors, and wherein the sensor data is LIDAR sensor data.

5. The method of claim 1, wherein the one or more sensors include one or more radar sensors, one or more cameras, or one or more sonar sensors.

6. The method of claim 1, wherein the determined driving maneuver includes reducing a current speed of the vehicle to a reduced speed at least until the dynamic obstacle is no longer located between the secondary occluded area and the vehicle, and
  wherein the driving maneuver further includes, after the dynamic obstacle is no longer located between the secondary occluded area and the vehicle, maintaining the reduced speed of the vehicle at least until the secondary occluded area is detectable by the one or more sensors.

7. The method of claim 1, wherein the determined driving maneuver includes a recommended vehicle speed, and wherein causing the vehicle to implement the determined driving maneuver includes causing the recommended vehicle speed to be displayed to an occupant of the vehicle.

8. The method of claim 1, wherein the driving maneuver is a first driving maneuver, and further including:
  acquiring sensor data, using one or more sensors, of the secondary occluded area;
  detecting whether one or more other obstacles are located in the secondary occluded area based on the acquired sensor data of the secondary occluded area, wherein the one or more other obstacles include one or more static obstacles or one or more dynamic obstacles;
  responsive to detecting that one or more other obstacles are located in the secondary occluded area, determining a second driving maneuver for the vehicle, the second driving maneuver being different from the first driving maneuver; and
  causing the vehicle to implement the determined second driving maneuver.

9. A system of determining occluded areas using static obstacle maps for a vehicle, the system comprising:
  one or more sensors, the one or more sensors being configured to acquire sensor data of at least a portion of an external environment of the vehicle; and
  a processor operatively connected to the one or more sensors, the processor being configured to:
    detect a dynamic obstacle in the external environment of the vehicle based on the acquired sensor data;
    determine whether a secondary occluded area is located behind the dynamic obstacle relative to a current location of the vehicle based on a static obstacle map;
    responsive to determining that a secondary occluded area is located behind the dynamic obstacle relative to a current location of the vehicle based on the static obstacle map, determine a driving maneuver for the vehicle based on at least the dynamic obstacle and the secondary occluded area; and
    cause the vehicle to implement the determined driving maneuver.

10. The system of claim 9, wherein the processor is further configured to:
  determine a velocity of the dynamic obstacle based on the acquired sensor data, and wherein determining a driving maneuver for the vehicle is further based on the determined velocity of the dynamic obstacle.

11. The system of claim 9, wherein determining whether the secondary occluded area is located behind the dynamic obstacle relative to the current location of the vehicle based on the static obstacle map includes:
  determining, using ray tracing on the static obstacle map, whether there is a first occluded sensor coverage area located behind a static obstacle included in the static obstacle map;
  determining, using ray tracing on the acquired sensor data, whether there is a second occluded sensor coverage area located behind the detected dynamic obstacle;
  responsive to determining that there is a first occluded sensor coverage area and a second occluded sensor coverage area, comparing the first occluded sensor coverage area to the second occluded sensor coverage area to determine whether there is an overlap between the first occluded sensor coverage area and the second occluded sensor coverage area; and
  responsive to determining that there is an overlap between first occluded sensor coverage area and the second occluded sensor coverage area, determining that there is a secondary occluded area, wherein the secondary occluded area is defined by the overlap.

12. The system of claim 9, wherein the one or more sensors include one or more LIDAR sensors, and wherein the sensor data is LIDAR sensor data.

13. The system of claim 9, wherein the one or more sensors include one or more radar sensors, one or more cameras, or one or more sonar sensors.

14. The system of claim 9, wherein the determined driving maneuver includes reducing a current speed of the vehicle to a reduced speed at least until the dynamic obstacle is no longer located between the secondary occluded area and the vehicle, and
  wherein the driving maneuver further includes, after the dynamic obstacle is no longer located between the secondary occluded area and the vehicle, maintaining the reduced speed of the vehicle at least until the secondary occluded area is detectable by one or more sensors.

15. The system of claim 9, wherein the determined driving maneuver includes a recommended vehicle speed, and wherein cause the vehicle to implement the determined driving maneuver includes cause the recommended vehicle speed to be displayed to an occupant of the vehicle.

16. The system of claim 9, wherein the driving maneuver is a first driving maneuver, wherein the one or more sensors are further configured to acquire sensor data of the secondary occluded area, and wherein the processor is further configured to:
    detect whether one or more other obstacles are located in the secondary occluded area based on the acquired sensor data of the secondary occluded area, wherein the one or more other obstacles include one or more static obstacles or one or more dynamic obstacles;
    responsive to detecting that one or more other obstacles are located in the secondary occluded area, determine a second driving maneuver for the vehicle, wherein the second driving maneuver is different from the first driving maneuver; and
    cause the vehicle to implement the determined second driving maneuver.

17. The system of claim 9, wherein the processor is further configured to:
    determine whether the acquired sensor data is occluded;
    determine an occluded area for the acquired sensor data that is determined to be occluded;
    determine a second driving maneuver for the vehicle based on at least the determined occluded area; and
    cause the vehicle to implement the determined second driving maneuver,
    wherein determine whether there is a secondary occluded area located behind the dynamic obstacle relative to a current location of the vehicle based on a static obstacle map is performed responsive to determining that the acquired sensor data is not occluded.

18. The system of claim 9, further including a data store communicatively linked to the processor, wherein the static obstacle map is included in the data store, and
    wherein the one or more sensors, the processor, and the data store are located onboard the vehicle.

19. The system of claim 9, further including a data store communicatively linked to the processor, wherein the static obstacle map is included in the data store, and
    wherein the data store is located on a server that is remote from the vehicle.

20. A method of updating a static obstacle map, the method comprising:
    acquiring sensor data, using one or more sensors, of at least a portion of an external environment of a vehicle;
    detecting an obstacle in the external environment of the vehicle based on the acquired sensor data;
    determining a location for the detected obstacle;
    determining, using a static obstacle map, whether the location of the detected obstacle is behind an expected location of a static obstacle included in the static obstacle map relative to a current location of the vehicle; and
    responsive to determining that the location of the obstacle is behind the expected location of a static obstacle included in the static obstacle map relative to the current location of the vehicle, sending a command to update the static obstacle map by removing the static obstacle.

* * * * *